United States Patent
Seo et al.

(10) Patent No.: US 9,913,171 B2
(45) Date of Patent: Mar. 6, 2018

(54) METHOD FOR ELIMINATING INTER-CELL INTERFERENCE IN NON-LICENSED BAND IN WIRELESS COMMUNICATION SYSTEM AND APPARATUS THEREFOR

(71) Applicant: LG ELECTRONICS INC., Seoul (KR)

(72) Inventors: Hanbyul Seo, Seoul (KR); Joonkui Ahn, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/327,019

(22) PCT Filed: Sep. 16, 2015

(86) PCT No.: PCT/KR2015/009697
§ 371 (c)(1),
(2) Date: Jan. 17, 2017

(87) PCT Pub. No.: WO2016/043512
PCT Pub. Date: Mar. 24, 2016

(65) Prior Publication Data
US 2017/0171781 A1 Jun. 15, 2017

Related U.S. Application Data

(60) Provisional application No. 62/052,442, filed on Sep. 18, 2014.

(51) Int. Cl.
*H04W 28/26* (2009.01)
*H04W 24/10* (2009.01)
(Continued)

(52) U.S. Cl.
CPC ......... *H04W 28/26* (2013.01); *H04J 11/0036* (2013.01); *H04W 24/10* (2013.01);
(Continued)

(58) Field of Classification Search
CPC . H04W 28/26; H04W 24/10; H04W 28/0268; H04W 28/0247; H04W 28/18;
(Continued)

(56) References Cited

U.S. PATENT DOCUMENTS

2006/0148411 A1* 7/2006 Cho ............... H04L 1/0026
455/67.13
2007/0072600 A1* 3/2007 Cho ............... H04L 45/123
455/423
(Continued)

FOREIGN PATENT DOCUMENTS

WO     2013059999      5/2013
WO     WO 2014/071638 A1 *  5/2014  ............ H04W 24/10

OTHER PUBLICATIONS

PCT International Application No. PCT/KR2015/009697, Written Opinion of the International Searching Authority dated Jan. 8, 2016, 18 pages.

*Primary Examiner* — Meless Zewdu
(74) *Attorney, Agent, or Firm* — Lee, Hong, Degerman, Kang & Waimey PC

(57) ABSTRACT

The present application discloses a method for reporting, by a terminal, channel state information in a non-licensed band in a wireless communication system. More specifically, the method comprises: establishing, through a higher layer, a plurality of reserved resource sections of a serving cell for channel state information measurement in the non-licensed band; and measuring/reporting, in each of the plurality of reserved resource sections, the channel state information of the non-licensed band on the basis of the result of sensing the carrier waves of an adjacent cell and whether a reserved
(Continued)

resource section of the adjacent cell is established, wherein the reserved resource section of the serving cell is determined based on a type of the reserved resource section of the serving cell measuring the channel state information.

12 Claims, 15 Drawing Sheets

(51) Int. Cl.
*H04J 11/00* (2006.01)
*H04W 28/02* (2009.01)
*H04W 28/18* (2009.01)

(52) U.S. Cl.
CPC ... *H04W 28/0247* (2013.01); *H04W 28/0268* (2013.01); *H04W 28/18* (2013.01)

(58) Field of Classification Search
CPC ..... H04W 28/16; H04W 24/00; H04W 28/02; H04W 28/20; H04W 72/1226; H04J 11/0036; H04J 11/00; H04L 47/821; H04L 47/827; H04L 65/10; H04L 47/72
See application file for complete search history.

(56) References Cited

U.S. PATENT DOCUMENTS

| | | |
|---|---|---|
| 2010/0190488 A1 | 7/2010 | Jung et al. |
| 2011/0081865 A1 | 4/2011 | Xiao et al. |
| 2012/0275322 A1* | 11/2012 | Ji .................... H04L 1/0027 370/252 |
| 2013/0083783 A1 | 4/2013 | Gupta et al. |
| 2013/0208600 A1* | 8/2013 | Campbell ............ H04W 24/06 370/241 |
| 2014/0029586 A1* | 1/2014 | Loehr ............... H04W 56/0005 370/336 |
| 2014/0204850 A1 | 7/2014 | Kim et al. |
| 2014/0233407 A1* | 8/2014 | Pourahmadi .......... H04L 5/0007 370/252 |
| 2014/0241191 A1* | 8/2014 | Yu ..................... H04L 5/005 370/252 |
| 2016/0242188 A1* | 8/2016 | Tiirola ................ H04W 72/082 |

* cited by examiner (A) CONTROL-PLANE PROTOCOL STACK (B) USER-PLANE PROTOCOL STACK

▨ : DMRS GROUP 1

▨ : DMRS GROUP 2

(a)  (b)

METHOD FOR ELIMINATING INTER-CELL INTERFERENCE IN NON-LICENSED BAND IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/009697, filed on Sep. 16, 2015, which claims the benefit of U.S. Provisional Application No. 62/052,442, filed on Sep. 18, 2014, the contents of which are all hereby incorporated by reference herein in their entirety.

TECHNICAL FIELD

The present invention relates to a wireless communication system, and more particularly, to a method of eliminating inter-cell interference in an unlicensed band in a wireless communication system and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the aforementioned discussion, the present invention intends to propose a method of eliminating inter-cell interference in an unlicensed band in a wireless communication system and an apparatus therefor in the following description.

Technical Solution

To achieve these and other advantages and in accordance with the purpose of the present invention, as embodied and broadly described, according to one embodiment, a method of reporting channel state information in an unlicensed band, which is reported by a user equipment in a wireless communication system, includes the steps of setting a plurality of reservation resource sections of a serving cell to measure the channel state information in the unlicensed band via a higher layer, measuring the channel state information on the unlicensed band in each of a plurality of the reservation resource sections based on a carrier sensing result of a neighbor cell and information on whether the neighbor cell sets a reservation resource section, and reporting the measured channel state information to the serving cell. In this case, if a reservation resource section of the serving cell for measuring the channel state information corresponds to a first type, the reservation resource section of the serving cell may correspond to a resource configured as a reservation resource section of the neighbor cell. If the reservation resource section of the serving cell for measuring the channel state information corresponds to a second type, the reservation resource section of the serving cell may correspond to a resource which is not configured as the reservation resource section of the neighbor cell.

To further achieve these and other advantages and in accordance with the purpose of the present invention, according to a different embodiment, a user equipment in a wireless communication system includes a wireless communication module configured to transceive a signal with a serving cell through a licensed band or an unlicensed band and a processor configured to process the signal, the processor configured to control the wireless communication module to measure channel state information on the unlicensed band in each of a plurality of reservation resource sections of the serving cell in the unlicensed band configured via a higher layer based on a carrier sensing result of a neighbor cell and information on whether the neighbor cell sets a reservation resource section and report the measured channel state information to the serving cell. In this case, if a reservation resource section of the serving cell for measuring the channel state information corresponds to a first type, the reservation resource section of the serving cell may correspond to a resource configured as a reservation resource section of the neighbor cell. If the reservation resource section of the serving cell for measuring the channel state information corresponds to a second type, the reservation resource section of the serving cell may correspond to a resource which is not configured as the reservation resource section of the neighbor cell.

Preferably, if the reservation resource section of the serving cell for measuring the channel state information corresponds to the first type, the channel state information is measured under an assumption that interference occurs due to a signal transmitted by the neighbor cell in the reservation resource section of the first type.

And, if the reservation resource section of the serving cell for measuring the channel state information corresponds to the second type, the channel state information is measured under an assumption that interference occurs from a node adjacent to the neighbor cell, although there is no interference due to a signal transmitted by the neighbor cell in the reservation resource section of the second type.

Of course, a plurality of the reservation resource sections may correspond to sections determined as being in a channel idle state as a result of carrier sensing of the serving cell.

More preferably, the reservation resource section of the second type is in a channel idle state as a result of carrier sensing of the neighbor cell and may correspond to a resource which is not configured as a reservation resource section by the neighbor cell. In addition, the reservation resource section of the serving cell for measuring the channel state information may correspond to a third type. In this case, the reservation resource section of the third type is in a channel busy state as a result of carrier sensing of the neighbor cell and may correspond to a resource which is not configured as a reservation resource section by the neighbor cell.

Advantageous Effects

According to embodiments of the present invention, it is able to efficiently eliminate inter-cell interference of an unlicensed band.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

In the present specification, a name of a base station can be used as a comprehensive terminology including an RRH (remote radio head), an eNB, a TP (transmission point), an RP (reception point), a relay, and the like.

Figure 1:
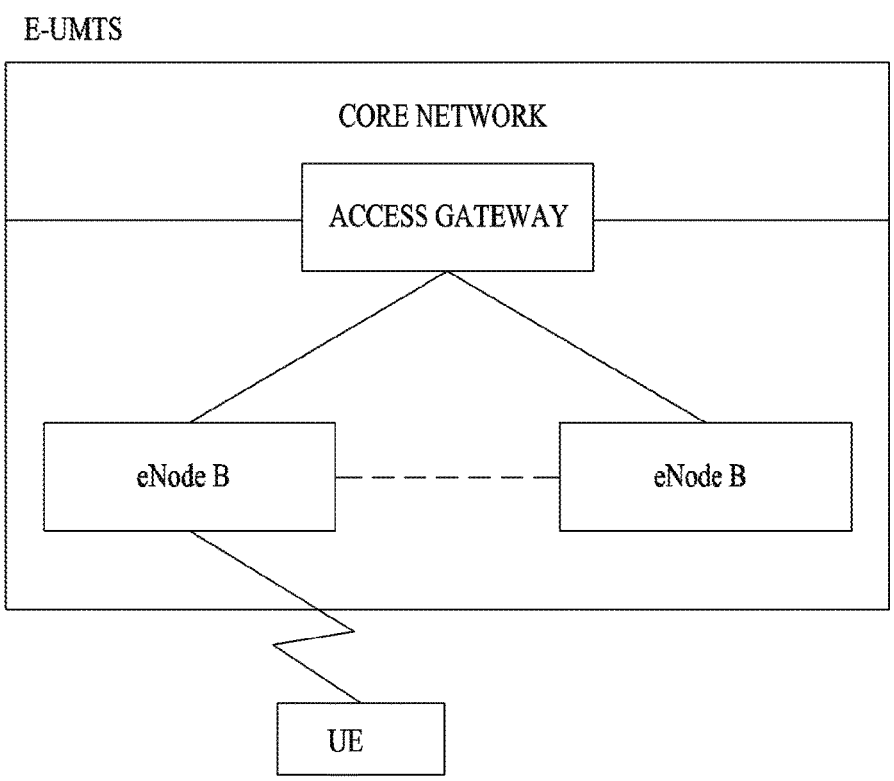
FIG. 1 is a schematic diagram of E-UMTS network structure as one example of a wireless communication system.
Figure 2:
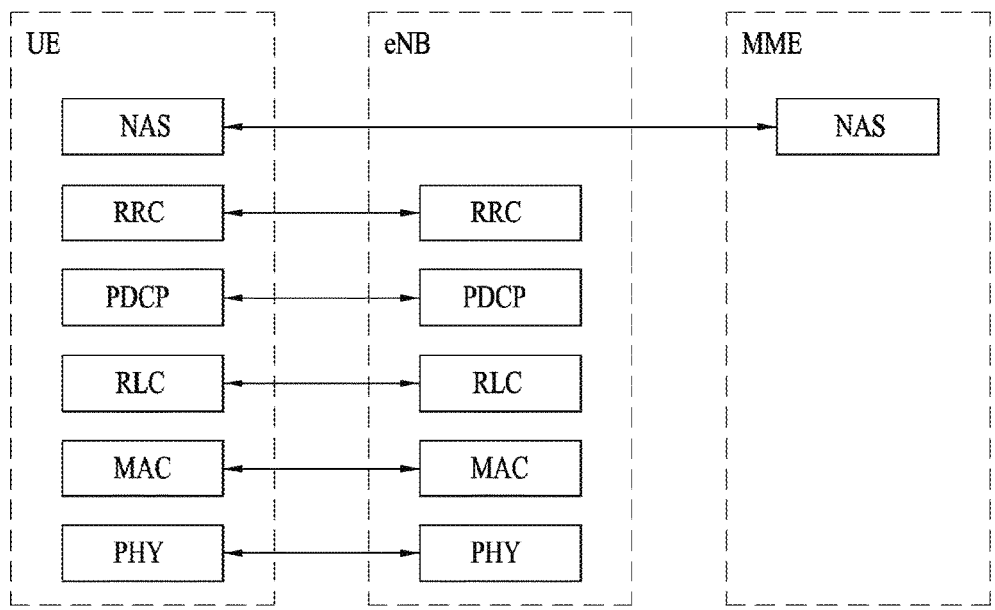
FIG. 2 is a diagram illustrating structures of a control plane and a user plane of a radio interface protocol between a user equipment and E-UTRAN based on the 3GPP radio access network standard.
Figure 2:
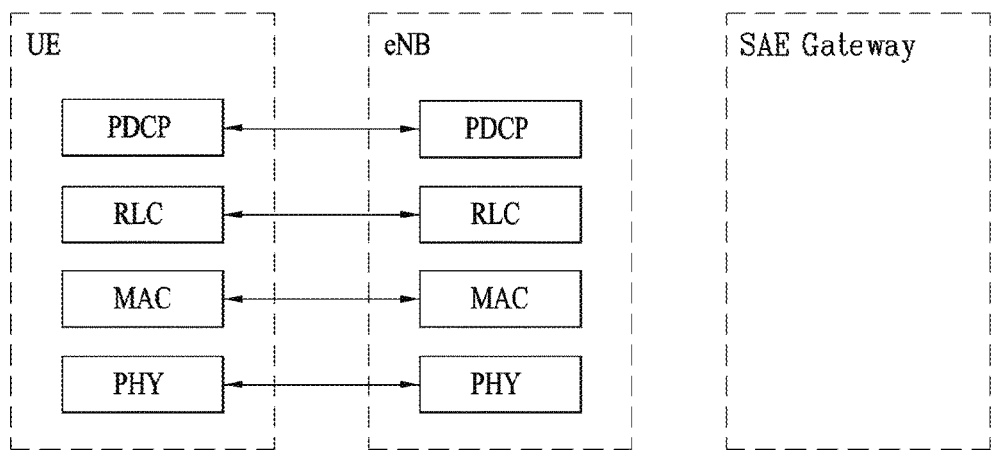

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. If there is RRC connection between a user equipment and an RRC layer of a network, the user equipment is in an RRC connected mode. Otherwise, the user equipment is in an RRC idle mode. A NAS (non-access stratum) layer, which is located at the top of the RRC layer, performs such a function as session management and mobility management.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
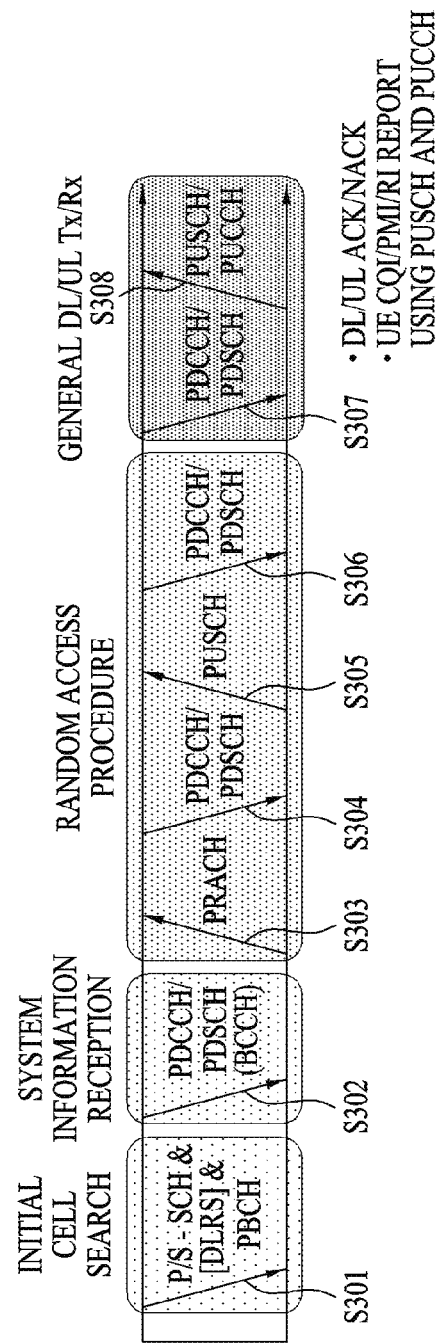
FIG. 3 is a diagram illustrating physical channels used in a 3GPP LTE system and a general method for transmitting a signal using the physical channels.

FIG. 3 is a diagram showing physical channels used in a 3GPP system and a general signal transmission method using the same.

When a UE is powered on or enters a new cell, the UE performs an initial cell search operation such as synchronization with an eNB (S301). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S302).

When the UE initially accesses the eNB or has no radio resources for signal transmission, the UE may perform a random access procedure (RACH) with respect to the eNB (steps S303 to S306). To this end, the UE may transmit a specific sequence as a preamble through a physical random access channel (PRACH) (S303 and S305) and receive a response message to the preamble through the PDCCH and the PDSCH corresponding thereto (S304 and S306). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S308), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
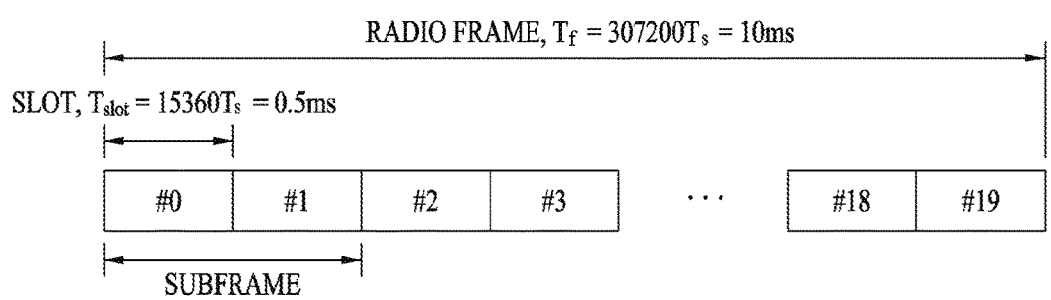
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms (327,200× $T_S$) and is constructed with 10 subframes in equal size. Each of the subframes has a length of 1 ms and is constructed with two slots. Each of the slots has a length of 0.5 ms (15,360×$T_S$). In this case, $T_s$ indicates a sampling time and is represented as $T_s=1/(15 \text{ kHz } 2048)=3.2552\times10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
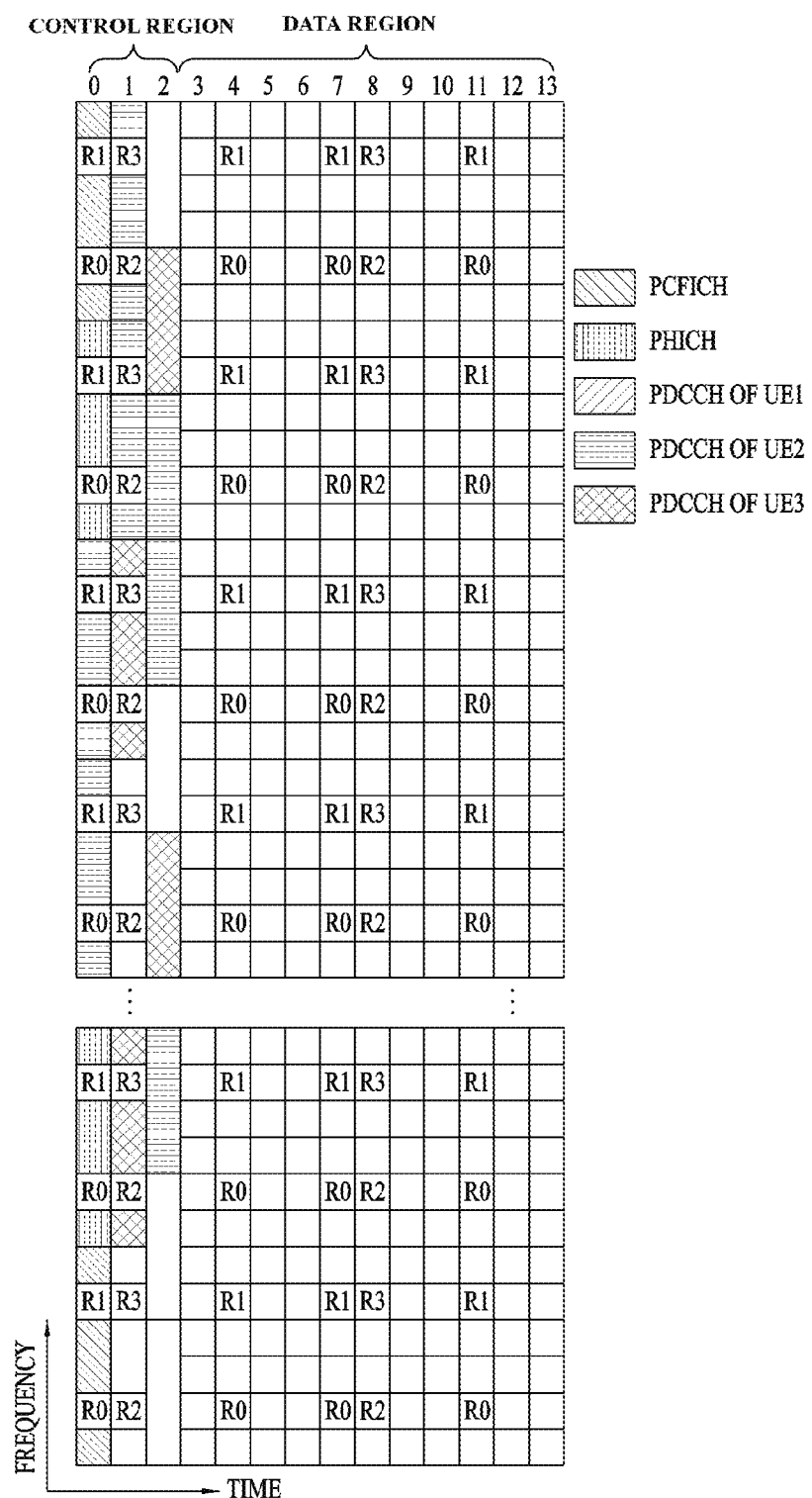
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
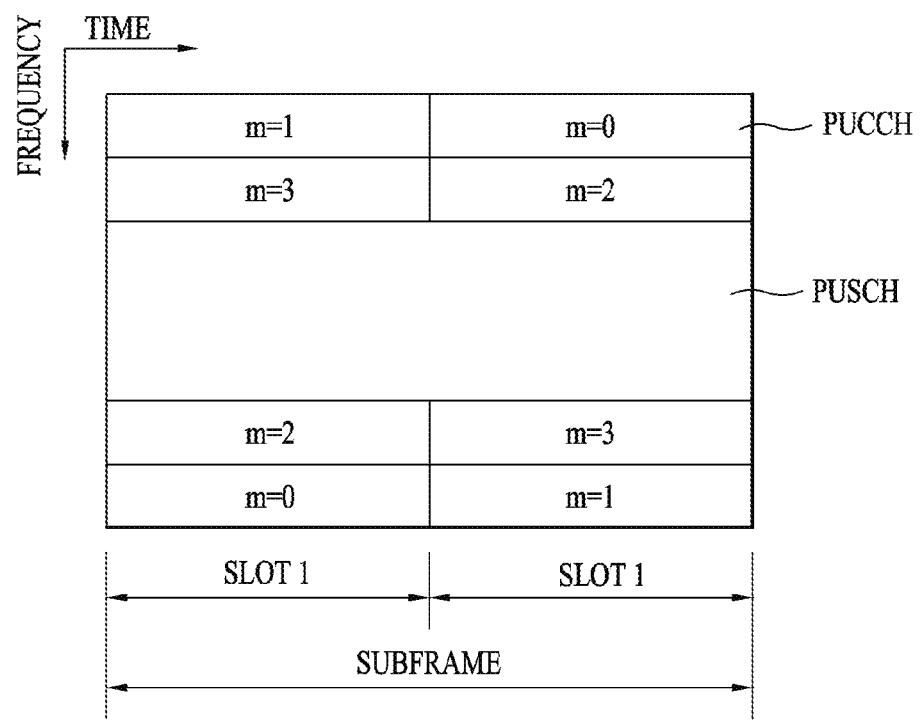
FIG. 6 is a diagram illustrating a structure of an uplink subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
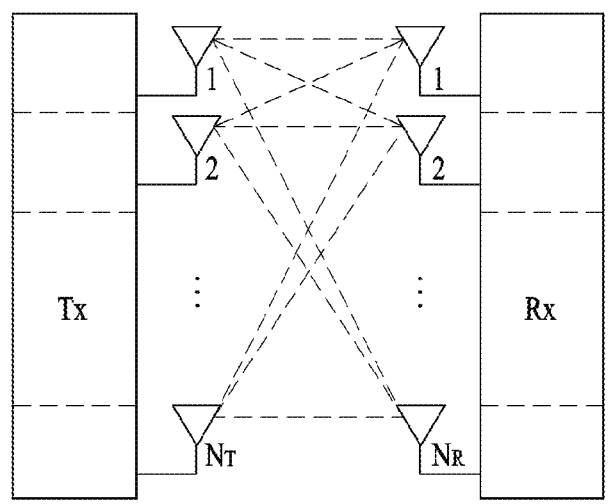
FIG. 7 is a diagram for a configuration of a general multi antenna (MIMO) communication system.

A block diagram of a general multi-antenna (MIMO) communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as Ro in case of using a single antenna, the transfer rate using multiple antennas can be theoretically increased as much as the maximum transfer rate Ro multiplied by a rate of increase Ri, as shown in the following Equation 1. In this case, the Ri is a smaller value among the $N_T$ and the $N_R$.

$$R_i = \min(N_T, N_R) \quad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Equation 2.

$$S=[S_1, S_2, \ldots, S_{N_T}]^T \qquad \text{[Equation 2]}$$

Meanwhile, for each of the transmission information $S_1$, $S_2, \ldots, S_{N_T}$, a transmit power may be differentiated according to the each of the transmission information. In this case, if each of the transmit powers is represented as $P_1$, $P_2, \ldots, P_{N_T}$, transmit power-adjusted transmission information can be represented as a vector in the following Equation 3.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

And, if ŝ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector Ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an $i^{th}$ transmitting antenna and $j^{th}$ information. The W is called the weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R) \qquad \text{[Equation 6]}$$

And, let's define each of the information different from each other, which are transmitted using a multi-antenna technology, as a 'transport stream' or simply a 'stream'. The 'stream' can be named a 'layer'. Then, the number of the transport stream is naturally configured not to be greater than the rank of the channel, which is a maximum number capable of transmitting information different from each other. Hence, the channel matrix H can be represented as Equation 7 in the following.

$$\text{\# of streams} \leq \text{rank}(H) \leq \min(N_T, N_R) \qquad \text{[Equation 7]}$$

In this case, '# of streams' indicates the number of streams. Meanwhile, in this case, it should be cautious that one stream can be transmitted via more than one antenna.

Various methods for making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following, CSI (channel state information) reporting is explained.

In current LTE standard, there exist two transmission schemes including open loop MIMO which is managed without channel information and closed loop MIMO which is managed based on channel information. In the closed loop MIMO, each of an eNB and a UE performs beamforming based on channel information to obtain a multiplexing gain of MIMO antenna. In order to obtain CSI from the UE, the eNB transmits a reference signal to the UE and commands the UE to feedback CSI measured based on the reference signal via PUCCH (physical uplink control channel) or PUSCH (physical uplink shared channel).

The CSI is mainly classified into RI, PMI, and CQI information. The RI (rank indicator) indicates rank information of a channel and the number of streams received by a UE through an identical frequency-time resource. Since the RI is dominantly determined by long term fading of a channel, the RI is fed back to the eNB from the UE with an interval longer than intervals of the PMI and the CQI in general.

The PMI (precoding matrix index) corresponds to a value to which a spatial characteristic of a channel is reflected. The PMI indicates a precoding matrix index of an eNB preferred by a UE on the basis of a metric such as SINR and the like. The CQI corresponds to a value indicating strength of a channel. In general, the CQI indicates reception SINR capable of being obtained when an eNB uses the PMI.

In the following, a reference signal is explained in more detail.

In general, in order to measure a channel, a reference signal already known to both a transmitting end and a receiving end is transmitted to the receiving end from the transmitting end together with data. The reference signal plays a role in performing a demodulation process by notifying not only channel measurement but also a modulation scheme. A reference signal is classified into a dedicated reference signal (DRS) for an eNB and a specific UE and a cell-specific reference signal or a common reference signal (common RS or cell-specific RS (CRS)). And, the cell-specific reference signal includes a reference signal for measuring CQI/PMI/RI and reporting the CQI/PMI/RI to an eNB. The reference signal is referred to as a CSI-RS (channel state information-RS).

Figure 8:
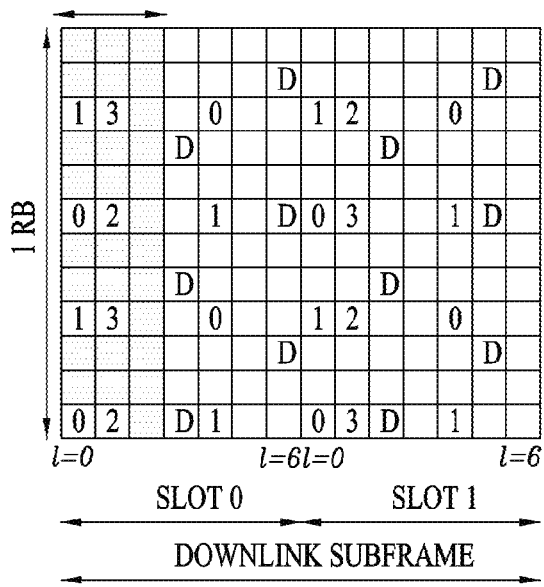
FIGS. 8 and 9 are diagrams for a structure of a downlink reference signal in LTE system supporting downlink transmission using 4 antennas.
Figure 9:
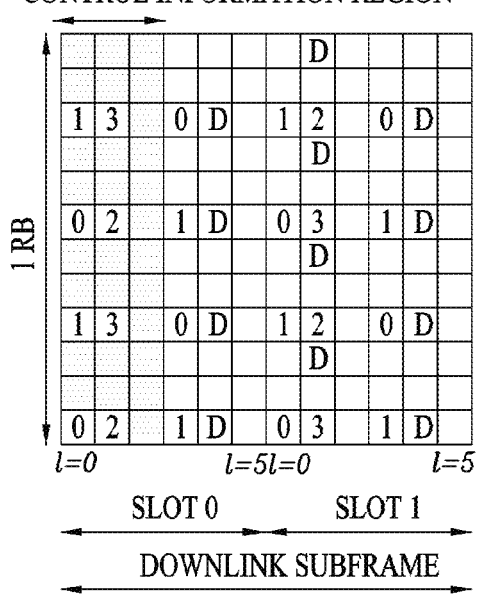

FIGS. 8 and 9 are diagrams for a structure of a downlink reference signal in LTE system supporting downlink transmission using 4 antennas. In particular, FIG. 8 shows a case of a normal cyclic prefix and FIG. 9 shows a case of an extended cyclic prefix.

Referring to FIGS. 8 and 9, 0 to 3 written on a grid corresponds to a CRS (common reference signal) which is a cell-specific reference signal transmitted to perform channel measurement and data demodulation in response to antenna ports 1 to 3. The cell-specific reference signal CRS can be transmitted to a UE not only over a data information region but also over a control information region.

And, 'D' written on a grid corresponds to a downlink DM-RS (demodulation-RS) which is a UE-specific RS and the DM-RS supports single antenna port transmission via a data region, i.e., PDSCH. Information on whether or not there exists the DM-RS corresponding to the UE-specific RS is signaled to a UE via higher layer. FIGS. 8 and 9 shows an example of a DM-RS corresponding to an antenna port 5. 3GPP standard document 36.211 also defines DM-RSs for antenna ports 7 to 14, i.e., 8 antenna ports in total.

Figure 10:
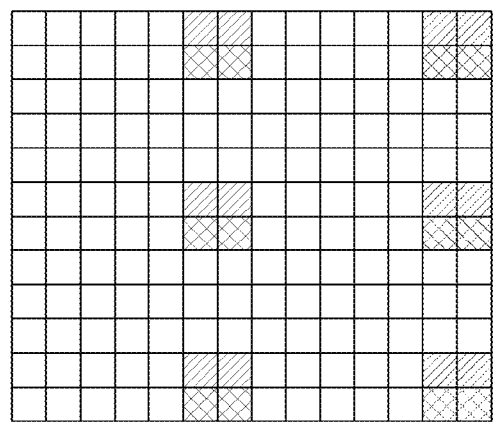
FIG. 10 is a diagram for an example of allocating a downlink DM-RS defined by current 3GPP standard document.

FIG. 10 is a diagram for an example of allocating a downlink DM-RS defined by current 3GPP standard document.

Referring to FIG. 10, DM-RSs corresponding to antenna ports {7, 8, 11, 13} are mapped to a DM-RS group 1 using a sequence per antenna port and DM-RSs corresponding to antenna ports {9, 10, 12, 14} are also mapped to a DM-RS group 2 using a sequence per antenna port.

Meanwhile, the aforementioned CSI-RS is proposed to measure a channel on PDSCH irrespective of a CRS. Unlike the CRS, the CSI-RS can be defined by maximum 32 different resource configurations to reduce ICI (inter-cell interference) in multi-cell environment.

Figure 11:
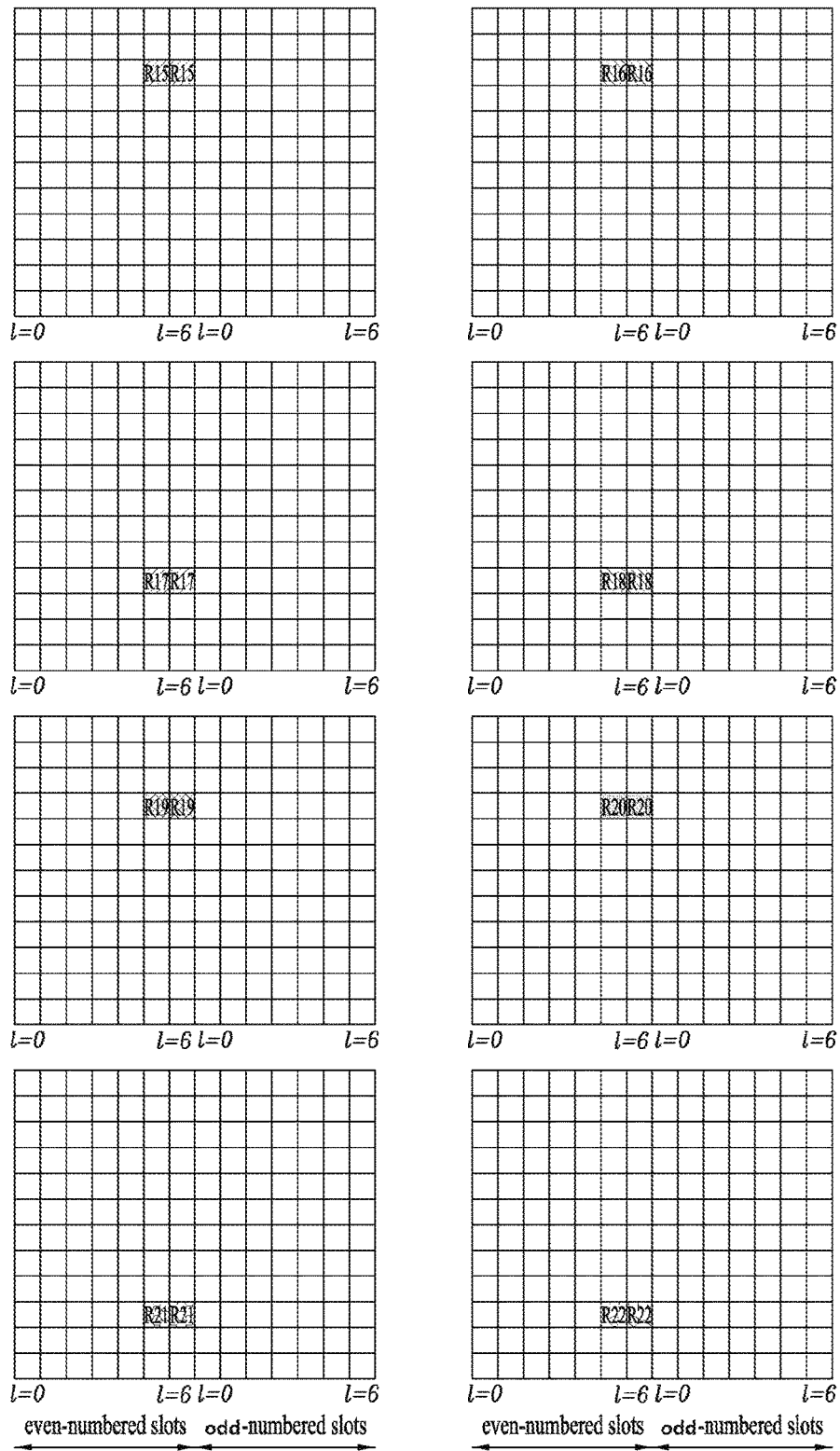
FIG. 11 is a diagram for an example of CSI-RS configuration #0 in case of a normal CP among downlink CSI-RS configurations defined in current 3GPP standard document.

A CSI-RS (resource) configuration varies according to the number of antenna ports and it is able to configure a CSI-RS defined by a different (resource) configuration to be transmitted between neighboring cells. Unlike the CRS, the CSI-RS supports up to maximum 8 antenna ports. According to 3GPP standard document, total 8 antenna ports (antenna ports 15 to 22) are assigned for the CSI-RS. FIG. 11 illustrates a CSI-RS configuration #0 in case of a normal CP among CSI-RS configurations defined by a current 3GPP standard document. And, it may be able to define a CSI-RS subframe configuration and the CSI-RS subframe configuration consists of a period ($T_{CSI-RS}$) represented by a subframe unit and a subframe offset ($\Delta_{CSI-RS}$).

Information on a ZP (zero-power) CSI-RS is transmitted via an RRC layer signal in a manner of being included in a CSI-RS-Config-r10 message. In particular, a ZP CSI-RS resource configuration consists of zeroTxPowerSubframe-Config-r10 and zeroTxPowerResourceConfigList-r10 corresponding to a bitmap of a size of 16 bits. In this case, the zeroTxPowerSubframeConfig-r10 indicates a period of transmitting the ZP CSI-RS and a subframe offset via $I_{CSI-RS}$ value. And, the zeroTxPowerResourceConfigList-r10 corresponds to information for indicating ZP CSI-RS configuration. Each element of the bitmap indicates configurations that the number of antenna ports for a CSI-RS corresponds to 4. In particular, according to a current 3GPP standard document, a ZP CSI-RS is defined for a case that the number of antenna ports for a CSI-RS corresponds to 4 only.

Meanwhile, an operation for calculating CQI via interference measurement is explained in the following.

It is necessary for a UE to calculate SINR as a factor necessary for calculating a CQI. In this case, reception power measurement (S-measure) of a desired signal can be performed using such an RS as an NZP CSI-RS and the like. In order to measure interference power (I-measure or IM (interference measurement)), power of an interference signal can be measured by eliminating the desired signal from the received signal.

Subframe sets $C_{CSI,0}$ and $C_{CSI,1}$ for measuring CSI can be signaled via higher layer signaling. A subframe corresponding to each of the subframe sets is included in a single set only without being overlapped with each other. In this case, a UE can perform the S-measure via such an RS as a CSI-RS without being restricted by a special subframe. Yet, in case of performing the I-measure, the UE individually performs the I-measure according to $C_{CSI,0}$ and $C_{CSI,1}$ to calculate two different CQIs for the $C_{CSI,0}$ and the $C_{CSI,1}$.

Figure 12:
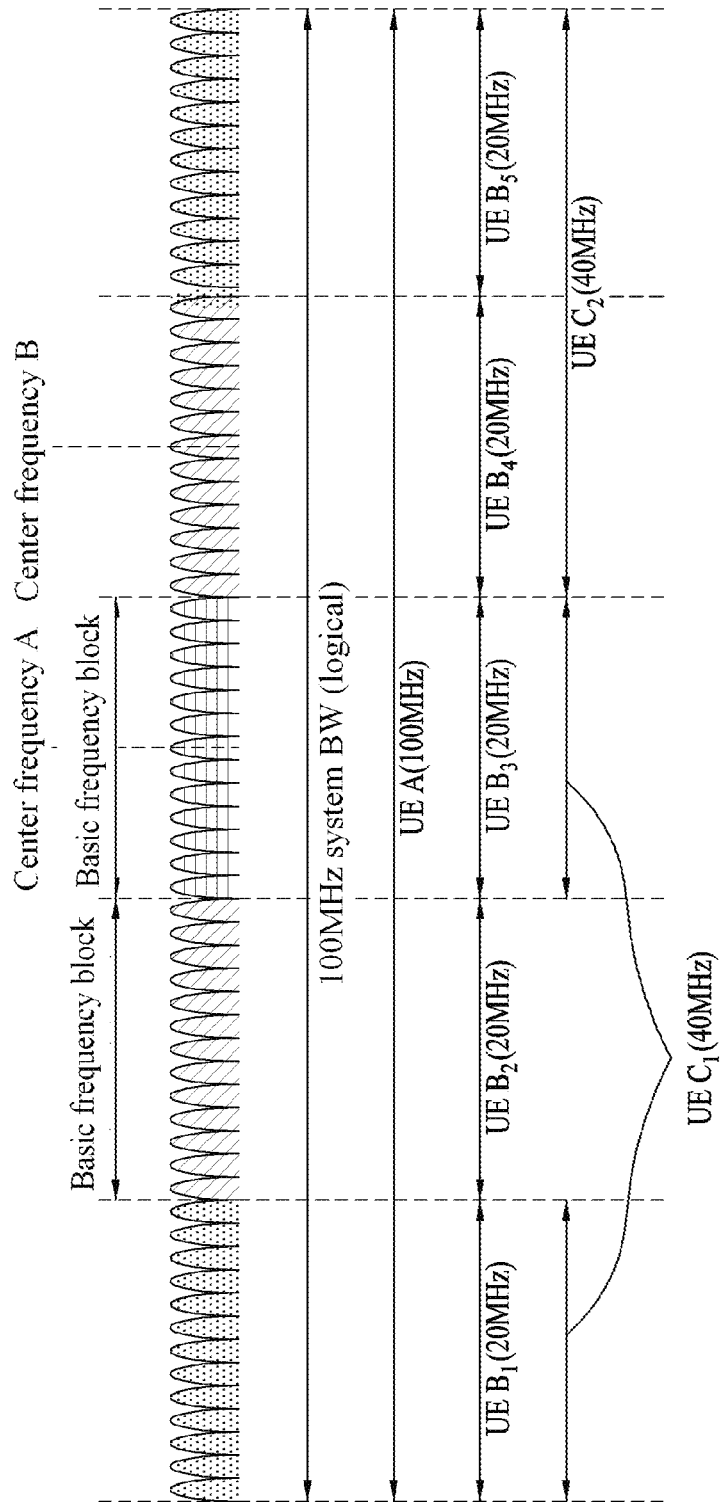
FIG. 12 is a conceptual diagram for explaining carrier aggregation.

In the following, a carrier aggregation scheme is described. FIG. 12 is a conceptual diagram for explaining carrier aggregation.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' is consistently used.

Referring to FIG. 12, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 12 illustrates the case in which component carriers have the same bandwidth, the case is purely exemplary, and thus, the component carriers may have different bandwidths. In addition, although FIG. 12 illustrates the case in which the component carriers are adjacent to each other in the frequency domain, FIG. 12 are logically illustrated, and thus, the component carriers may be physically adjacent to each other or may be spaced apart from each other.

Component carriers can use different center frequencies or use one common center frequency with respect to physically adjacent component carriers. For example, in FIG. 12, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 8. A downlink component carrier or a combination of the downlink component carrier and a uplink component carrier corresponding to the downlink component carrier may be referred to as a cell. A corresponding relation between a downlink component carrier and an uplink component carrier can be indicated via system information.

In this case, a method for scheduling a data channel by a control channel may be classified into a linked carrier scheduling method and a cross carrier scheduling method.

More specifically, in the linked carrier scheduling method, a control channel transmitted through a specific component carrier schedules only a data channel through the specific component carrier like in a legacy LTE system using a single component carrier. In particular, a downlink grant/uplink grant transmitted to PDCCH region of a downlink component carrier of the specific component carrier (or specific cell) can schedule only PDSCH/PUSCH of a cell to which the downlink component carrier belongs thereto. In particular, a search space corresponding to a region for attempting to detect the downlink grant/uplink grant exists at a PDCCH region of a cell at which PDSCH/PUSCH corresponding to a scheduling target is located.

Meanwhile, in the cross carrier scheduling method, a control channel transmitted through a primary component carrier (primary CC) using a carrier indicator field (CIF) schedules a data channel transmitted through the primary CC or a different CC. In other word, in the cross carrier scheduling method, a monitored cell (or a monitored CC) is set and a downlink grant/uplink grant transmitted in PDCCH region of the monitored cell schedules PDSCH/PUSCH of a cell configured to be scheduled in the cell. In particular, a search space for a plurality of component carriers exists at PDCCH region of the monitored cell. The Pcell is set among a plurality of the cells to transmit system information, attempt initial access, and transmit uplink control information. The Pcell includes downlink primary component carrier and an uplink primary component carrier corresponding to the downlink primary component carrier.

In the following, a method of transmitting and receiving a signal through an unlicensed band is explained.

Figure 13:
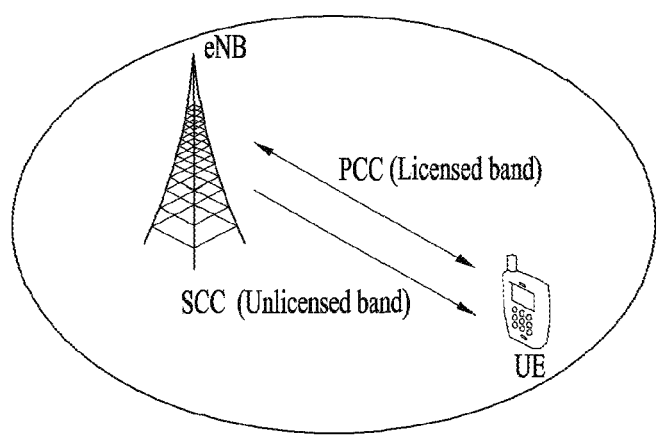
FIG. 13 is a diagram for an example of a carrier aggregation situation of a licensed band and an unlicensed band.

FIG. 13 is a diagram for an example of a carrier aggregation situation of a licensed band and an unlicensed band.

Referring to FIG. 13, an eNB can transmit a signal to a UE or the UE can transmit a signal to the eNB in a carrier aggregation situation of an LTE-A band corresponding to a licensed band and an unlicensed band. In the following description, for clarity, assume that the UE is configured to perform wireless communication through two component carriers in the licensed band and the unlicensed band, respectively. In this case, a carrier of the licensed band corresponds to a primary component carrier (primary CC) (PCC) or Pcell) and a carrier of the unlicensed band corresponds to a secondary component carrier (secondary CC (SCC) or Scell). Yet, methods proposed by the present invention can also be extensively applied to a situation that a plurality of licensed bands and a plurality of unlicensed bands are used via carrier aggregation scheme. And, the methods can also be applied to a case that a signal is transceived between an eNB and a UE via an unlicensed band only.

As an example of an unlicensed band operation operating in a contention-based random access scheme, an eNB can perform carrier sensing (CS) before transmitting and receiving data. The eNB checks whether a current channel state of a Scell is busy or idle. If it is determined as the channel is idle, the eNB transmits a cross scheduling grant for the Scell through PDCCH (or EPDCCH (enhanced-PDCCH)) of a Pcell or PDCCH of the Scell and may be then able to attempt to transmit and receive data. In particular, the eNB may attempt to receive PDSCH.

In this case, as an example, it may be able to configure a transmission opportunity (TxOP) (or reserved resource period (RRP)) consisting of M number of contiguous subframes (SFs). In this case, the eNB may inform the UE of an M value and M number of SF usages in advance through higher layer signaling (using the Pcell) or a physical layer control/data channel.

In case of an eNB operating on an unlicensed band, since a part of neighboring eNBs operating on the same band belongs to a different operator or uses a different radio access technology such as WiFi and the like, the eNB is unable to perform coordination on resource utilization and the eNB may face a situation of performing resource contention only according to a CS result. Regarding this, it shall be described with reference to drawing.

Figure 14:
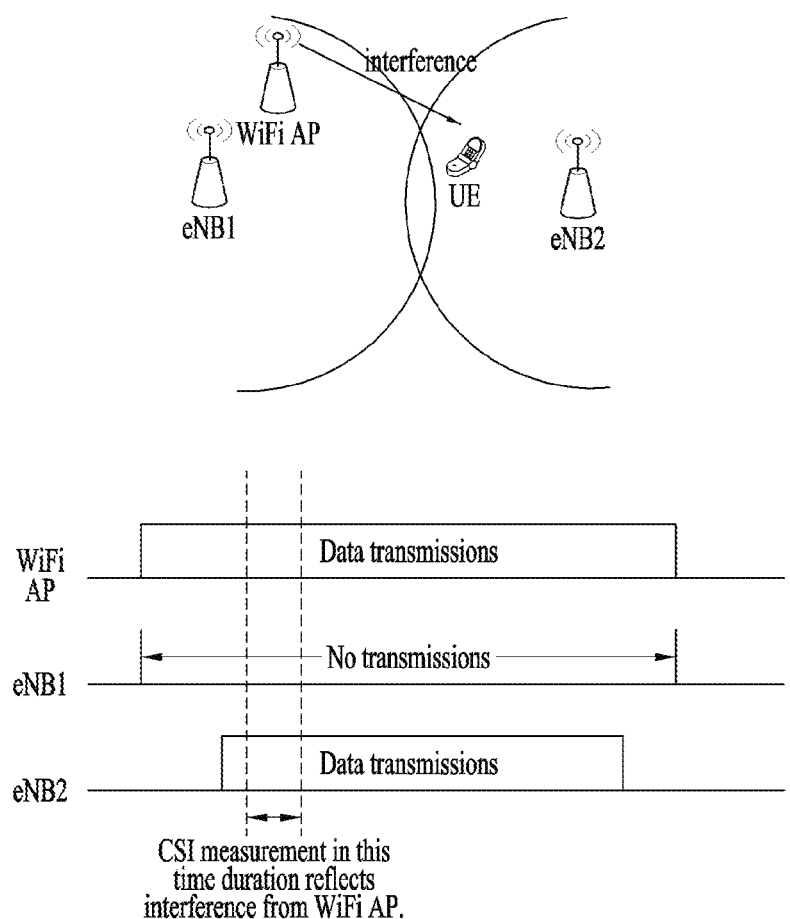
FIG. 14 is a diagram for an example of performing resource contention according to channel sensing sensed on an unlicensed band.

FIG. 14 is a diagram for an example of performing resource contention according to channel sensing sensed on an unlicensed band.

Referring to FIG. 14, a channel of an eNB1 is busy due to data transmission of a neighboring WiFi AP. On the contrary, a channel of an eNB2 is idle. In this case, a specific eNB is able to perform DL transmission at specific timing, but a different eNB is unable to perform DL transmission due to transmission of a different node adjacent to the different eNB. Unless the number of backhaul links for connecting two eNBs is configured to have a very small time delay such as micro second, the two eNBs are unable to identify a mutual CS result. In other word, the two eNBs are unable to identify a channel state affected by a node adjacent to the other eNB.

As mentioned earlier in FIG. 14, if it is difficult to identify a CS result of a neighboring eNB, an ICIC (inter-cell interference cancellation) operation between eNBs may have negative effects. According to a series of ICIC operations named as resource specific transmit power reduction, an eNB forwards a message to a neighboring eNB to indicate that the eNB is going to reduce transmit power in a specific time/frequency resource (including muting that transmit power is set to 0). Having received the message, the neighboring eNB schedules a UE with higher MCS in a low power resource under an assumption that interference from the message transmitting eNB is reduced. In particular, the specific time/frequency resource can be named as a low power resource.

However, as shown in FIG. 14, although an eNB1 does not perform transmission in a specific resource, if it is a CS result resulted from transmission of a different node adjacent to the eNB1, strong interference is applied to a corresponding UE, which is not different from a case that the eNB1 performs transmission. In this case, if an eNB2 schedules the UE with higher MCS while failing to recognize the aforementioned fact, it is highly probable to have a packet error, thereby deteriorating performance.

Moreover, since it is unable to guarantee a resource capable of being used by a specific eNB in an unlicensed band, if information on a low power resource is semi-statically shared with a neighboring eNB in advance via a backhaul link, it may cause a phenomenon of degrading resource utilization. When a specific eNB semi-statically designates a specific resource as a low power resource and a CS result stochastically shows an idle channel, if the CS result and the low power resource promised in advance are overlapped with each other in many parts, an amount of resource capable of being practically used by the eNB is considerably reduced.

In the following, a method of performing the aforementioned low power resource-based ICIC operation in the unlicensed band is explained in detail. In particular, a case that an eNB participating in the ICIC is connected via a backhaul link capable of sharing a CS result in real time and an opposite case are explained, respectively.

1) Case that CS Result is Quickly Shared Between eNBs

In this case, since time delay of a backhaul link for connecting two eNBs is scores of micro seconds or less, a CS result of an eNB can be delivered to another eNB in almost real time. In this case, an eNB1 informs an eNB2 of a CS result of the eNB1 and the eNB2 delivers a signal to which the result is reflected to a UE. By doing so, it may be able to make an appropriate CSI measurement to be performed in the UE.

In particular, the eNB1 can inform the eNB2 that interference stronger than a prescribed level is measured based on the CS result as well as the busy channel. This may indicate that a device very close to the eNB1 is occupying a channel. Having received the information, the eNB2 is able to anticipate that interference very similar to the actual transmission of the eNB may occur. Of course, the eNB1 may forward a power level on a channel measured by CS result of the eNB1 to the eNB2 and the eNB2 may reflect the result.

In particular, the signaling to the UE can be represented as a part of the aforementioned RRP signaling. It is preferable for a UE operating on a general unlicensed band to measure CSI in a resource only configured as RRP by a serving eNB of the UE. This is because, when the serving eNB transmits an actual data based on the CSI, a different eNB adjacent to the serving eNB does not transmit a CS result due to the transmission of the serving eNB and does not cause any interference.

As mentioned above, if the operation of measuring the CSI is performed in the inside of the RRP only, the serving eNB divides the RRP into a plurality of types and makes each of a plurality of the types to be interlocked with a CS result of the neighboring eNB. Subsequently, the UE measures a separate CSI according to an RRP type and reports the measured separate CSI to the eNB.

Figure 15:
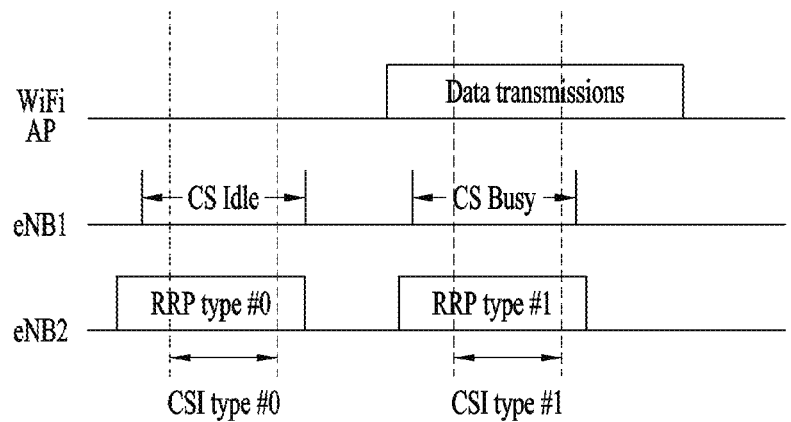
FIG. 15 is a diagram for an example of measuring and reporting separate CSI according to an RRP type in accordance with embodiment of the present invention.

FIG. 15 is a diagram for an example of measuring and reporting separate CSI according to an RRP type in accordance with embodiment of the present invention. In particular, FIG. 15 shows a case that the eNB1 delivers the CS result to the eNB2 in real time and the eNB2 configures two types of the RRP according to the CS result of the eNB1 in the case of FIG. 14. In this case, an RRP type #0 corresponds to a case that the CS result of the eNB1 is idle and an RRP type #1 corresponds to a case that the CS result of the eNB1 is busy.

Of course, in order for the eNB2 to configure RRP irrespective of a type, a CS result of the eNB2 should be idle. In this case, if the eNB1 informs the eNB2 of CS idle, the eNB2 may be able to use CSI which is previously measured/reported by the UE using the RRP type #0. In this case, since there is no interference from a node not participating in the coordination shown in FIG. 14 and it is able to anticipate an interference situation, an ICIC operation can be performed based on a low power resource which is exchanged through an ICIC message.

In case of the RRP type #1 of FIG. 15, interference examined by the UE may be unstable. Hence, in case of scheduling a UE adjacent to the eNB2 or a UE far from the eNB2, MCS can be more conservatively configured in consideration of the uncertainty (in other word, inaccuracy of CSI feedback) of the interference. If the eNB1 performs resource-specific CS (e.g., if the entire time/frequency resources are divided into a plurality of groups and CS is performed according to each of a plurality of the groups), the eNB1 forwards a CS result per resource group to the eNB2 and the eNB2 can perform scheduling of the eNB2 and RRP type configuration based on the CS result. In particular, in this case, the eNB2 may be able to configure a single RRP of a different RRP type according to whether or not the CS result of the eNB1 is idle in a resource group and separately configure RRP of the eNB2 according to a resource group. Hence, the eNB2 can differently configure an RRP type of each resource group.

A similar operation can be applied on the basis of whether or not DL transmission is performed by a neighboring eNB, i.e., whether or not RRP of the neighboring eNB is set, instead of a CS result of the neighboring eNB. Regarding this, it shall be described with reference to drawing.

Figure 16:
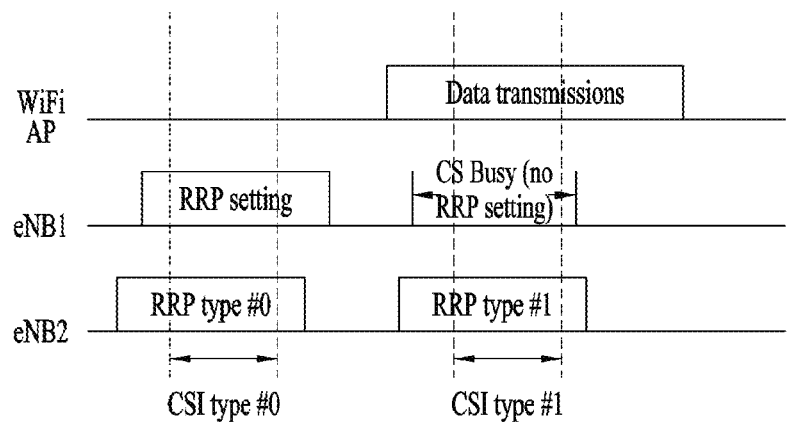
FIG. 16 is a diagram for a different example of measuring and reporting separate CSI according to an RRP type in accordance with embodiment of the present invention.

FIG. 16 is a diagram for a different example of measuring and reporting separate CSI according to an RRP type in accordance with embodiment of the present invention.

Referring to FIG. 16, the eNB1 informs the eNB2 adjacent to the eNB1 of whether or not DL transmission is performed by the eNB1 or whether or not RRP of the eNB1 is set. The eNB2 can signal a case of setting RRP set by the eNB1 and a case of not setting RRP to a UE connected with the eNB2 using a different RRP type.

In this case, an RRP type #0 indicates a case that the eNB1 sets RRP and an RRP type #1 indicates a case that the eNB1 does not set RRP. Compared to a case of identifying an RRP type based on a CS result of the eNB1, although the eNB1 detects idle based on the CS result, if the eNB1 has no data to transmit, the eNB1 may not set RRP. In this case, since a different node adjacent to the eNB1 may start transmission in a minute, the CS idle of the eNB1 does not always guarantee predictable interference.

On the contrary, when the RRP configuration of the eNB1 becomes a reference, if the eNB1 sets RRP, since a node adjacent to the eNB1 does not perform transmission due to CS busy, stability of interference increases. Hence, matching possibility between a low power resource exchanged through an ICIC message and an actual low interference resource becomes higher.

In this case, since the eNB1 performs actual transmission after RRP is set, it may have a restriction on a low power resource configuration. The restriction can be solved by mixing a low power resource and a high power resource together.

Figure 17:
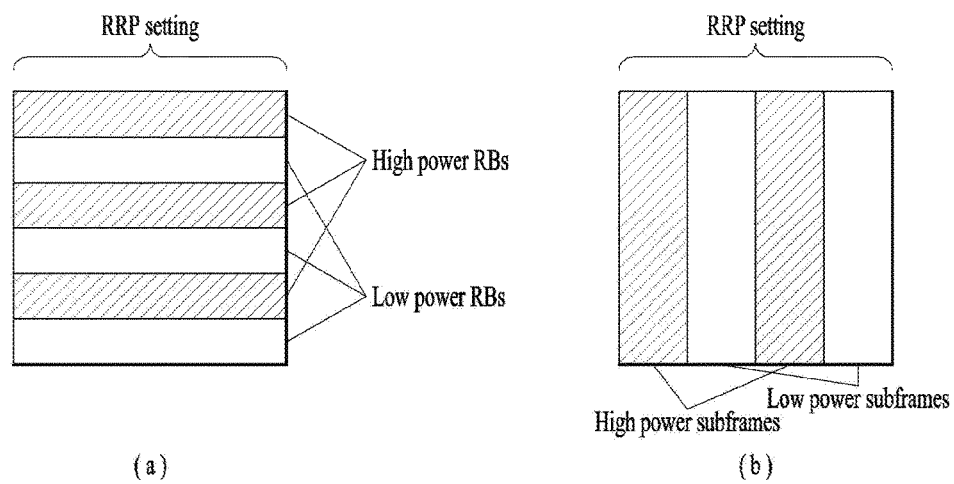
FIG. 17 is a diagram for an example of mixing a low power resource and a high power resource according to embodiment of the present invention.

FIG. 17 is a diagram for an example of mixing a low power resource and a high power resource according to embodiment of the present invention.

First of all, as shown in FIG. 17 (a), when the RRP is set, a low power resource and a high power resource can be mixed together in frequency domain. By doing so, the eNB2 can perform the ICIC operation through the low power frequency resource delivered via the ICIC message while making a different node detect CS busy due to transmission in a high power frequency resource. Or, as shown in FIG. 17 (b), it may mix a low power time resource and a high power time resource with each other based on a subframe position in the inside of RRP setting. It may indicate that information on a low power resource in frequency domain, which is delivered to the eNB2 by the eNB1, is valid only in a place to which RRP is set by the eNB1.

If the eNB1 resource-specifically sets the RRP (e.g., the entire time/frequency resources are divided into a plurality of groups and RRP is set to each of a plurality of the groups), the eNB1 delivers RRP setting result to the eNB2 according to each resource group and the eNB2 can perform scheduling of the eNB2 and RRP type configuration based on the RRP setting result. In particular, in this case, the eNB2 may be able to configure a single RRP of a different RRP type according to resource groups to which the RRP is set by the eNB1 and separately configure RRP of the eNB2 according to a resource group. Hence, the eNB2 can differently configure an RRP type of each resource group.

In order to integrate the operations mentioned earlier in FIG. 15 and FIG. 16, RRP type is divided into 3 types (if there are a plurality of resource groups, RRP type is divided into 3 types per resource group) and CSI can be measured by defining each type as follows.

- A type for setting RRP when an eNB1 is CS idle=>it is able to predict interference from the eNB1 only
- A type not setting RRP although the eNB1 is CS idle=>there is no interference from the eNB1 and interference of a node adjacent to the eNB1 may appear only
- A type that the eNB1 is CS busy=>there is no interference from the eNB1 and interference of a node adjacent to the eNB1 may appear only Meanwhile, although it is able to identify a CS result of a neighboring eNB or information on whether or not RRP is set in real time with the help of a fast backhaul link, there may exist some backhaul delay and processing delay of an eNB. Hence, if RRP settings of two eNBs occur at the same time, it may be impossible for one eNB to notify whether or not RRP is set by another eNB or a CS result at the time of setting RRP by one eNB. And, since timing at which CS idle is examined is different from each other according to an eNB in general, while an eNB sets RRP, a CS result or an RRP setting of another eNB may change. To cope with this, signaling for setting RRP and signaling for notifying a type of RRP can be separated from each other in time.

As an example, an eNB preferentially informs a UE of information on a start and an end of RRP and informs the UE of a type of the RRP at upcoming specific timing. Having received the information, the UE performs CSI measurement/report to correspond to the type of the RRP. In this case, if a plurality of RRP types are set to the UE, the UE is unable to identify a region at which interference occurs until the UE receives an RRP type. Hence, in this case, it is preferable to consider that the region is invalid in interference measurement. Specifically, since there is a possibility that a CS result or RRP setting of a neighboring eNB is frequently changed in an RRP setting of an eNB, signaling on a plurality of RRP types may occur after the RRP setting.

2) Case that Quick CS Result Sharing is not Available Between eNBs

In this case, since it is impossible to share a CS result between eNBs in real time, an operation of directly designating a type of RRP to a UE is unavailable. In this case, the UE measures interference from a specific resource only and reports CSI. Then, an eNB receives information on an operation performed in the resource from a neighboring eNB, estimates a situation at which the CSI reported by the UE is measured, and utilizes the estimation for the future scheduling.

A time resource is explained as an example. First of all, when the UE measures the CSI, the UE measures interference of a single subframe only to calculate the CSI without averaging measurement values measured from a plurality of subframes. According to LTE CSI, a reference resource of the CSI is determined according to a predetermined rule on the basis of timing at which the CSI is reported by the UE. Hence, the UE may report aperiodic CSI based on interference measured from the reference resource only. In particular, CSI measured from a single resource is more appropriate for the aperiodic CSI that reports all CSIs by a single report.

While the CSI is measured/reported, an eNB receives information on an operation performed at each timing and information on a CS result from a neighboring eNB. Referring back to such a configuration as the RRP type #0 mentioned earlier in FIG. 16, the UE measures CSI in a subframe #n and reports the CSI to the eNB2. At the same time, the eNB1 informs the eNB2 that the eNB1 has performed RRP setting in the subframe #n. Then, the eNB2 is able to know that the reported CSI corresponds to CSI, which is predicted when the eNB1 performs RRP setting. In particular, if the eNB1 and the eNB2 share information on subframes set by low power and subframes set by high power in advance, the eNB2 is able to know that the CSI corresponds to CSI in a low power subframe or a high power subframe when the eNB1 corresponds to a main interference factor. And, the eNB2 can utilize the information for setting MCS in each subframe in an RRP situation of the eNB1.

Similarly, if the eNB1 and the eNB2 make a promise for RBs to be set by low power and high power in advance, the eNB2 is able to know that the CSI corresponds to CSI in a low power RB or a high power RB when the eNB1 corresponds to a main interference factor. And, the eNB2 can utilize the information for setting MCS in each RB in an RRP situation of the eNB1. Of course, although it is unable to guarantee that the eNB1 is able to perform RRP setting again in the future (since a CS result of the eNB1 may correspond to busy at that timing), if the RRP setting of the eNB1 is enabled, interference to be experienced by the UE can be predicted. Hence, it can be considered as a sort of stochastic ICIC, i.e., ICIC, which is operated when an event of probability that the eNB1 and the eNB2 perform RRP setting at the same time occurs, is performed.

In the aforementioned operation, when the UE measures interference in a subframe set designated by a network in similar environment, the interference measurement has no restriction. The UE can measure interference in a random time/frequency domain in the subframe set. When a legacy operation and the aforementioned operation exist together, it is necessary for the network to clearly regulate an operation of the UE. Hence, it is preferable for the network to signal the UE on whether interference measurement is performed in a subframe unit or an RB (or an RB group) unit and whether or not the interference measurement is combined with a measurement value measured from a different subframe or an RB (or RB group).

In case of performing the aforementioned ICIC operation, a method of designating a low power time resource is explained in detail.

For example, when the eNB1 informs the eNB2 of a low power subframe pattern and a high power subframe pattern shown in FIG. 17 (b), if a specific subframe #n corresponds to a low power subframe, the specific subframe #n may indicate a relative position in an RRP section that a start point of the specific subframe #n is flexible according to a CS result rather than an $n^{th}$ subframe appearing in a fixed time axis like a Pcell operating on a licensed band. In particular, if the subframe #n corresponds to the low power subframe, it indicates that an $n^{th}$ subframe from the timing at which RRP starts corresponds to the low power subframe. Regarding this, it shall be described with reference to drawing.

Figure 18:
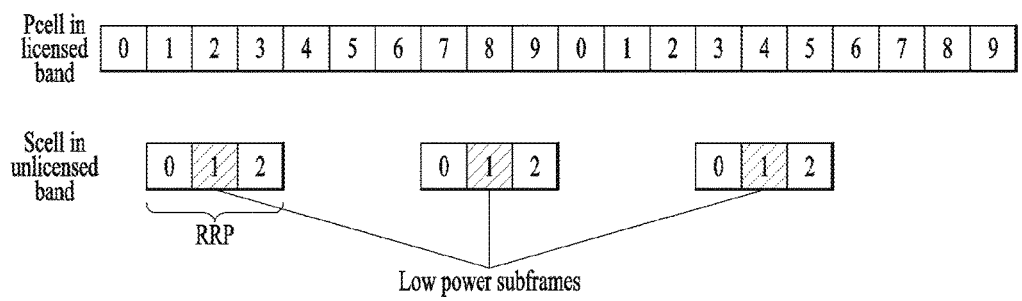
FIG. 18 is a diagram for an example of designating a low power subframe according to embodiment of the present invention.

FIG. 18 is a diagram for an example of designating a low power subframe according to embodiment of the present invention.

Referring to FIG. 18, it is able to see that a subframe #1 is designated as a low power subframe in advance in a situation that one RRP includes 3 subframes. In this case, the low power subframe indicates a relative position in RRP considering a subframe #0 as the start point of the RRP. An index of the low power subframe may have a value rather than 1 on the fixed time axis defined in an actual Pcell.

If a low power subframe and a high power subframe are designated on the fixed time axis, an eNB1 may want the low power subframe and the high power subframe to appear in the RRP in a manner of being mixed by a ratio preferred by the eNB1. However, the number of the low power subframe and the number of the high power subframe included in a section to which the actual RRP is set varies according to the start point of the RRP.

On the contrary, if positions of the low power subframe and the high power subframe are designated by a relative position of the RRP section, the number of the low power subframe and the number of the high power subframe preferred by the eNB1 appear in every RRP. For the same reason, a CSI measurement subframe pattern forwarded to the UE by the eNB2 may also appear at a relative position in the RRP section.

The operation mentioned earlier in FIG. 17 (a) enables frequency domain ICIC that an eNB transmits a signal using a partial frequency resource only among the whole bandwidths and a different eNB uses an empty frequency without interference. In particular, the operation is more effective when an eNB transmits a signal to a UE using MCS that a coding rate is not big.

Specifically, when an eNB has restricted transmit power, if the eNB uses a wider frequency band, the eNB is able to use more REs. Instead, since energy per RE should uniformly distribute the transmit power to the whole band, the energy is reduced. Hence, information amount capable of being transmitted according to an RE is reduced. Hence, a given data is transmitted by a lower coding rate, i.e., the given data is transmitted by increasing the number of coding bits and transmit power used for each coded bit is reduced. On the contrary, in case of using a narrower band, although the less number of REs are used, it is able to increase energy per RE. In general, when a coding rate is low, although the coding rate is lowered using more REs, if energy per RE is reduced as many as the REs, it is difficult to have performance gain.

Hence, an eNB considers a channel state of a UE to which a signal transmitted by the eNB is to be transmitted. When the channel state of the UE is poor and the eNB transmits a signal to the UE with a relatively low coding rate, as shown in FIG. 17 (a), it is preferable that the eNB transmits the signal with high PSD (power spectral density) in a partial frequency domain instead of transmitting the signal with low PSD in an unnecessarily wide band. The aforementioned operation does not influence on the transmission capability of the eNB and may have an effect that a transmission resource of a different eNB is emptied out.

If the eNB transmits a signal in a partial frequency domain only among the whole band, it is necessary to modify a general CS operation. In general, when the CS operation is performed, the eNB preferentially measures power of all signals on a channel. If a value of the measured power is greater than a predetermined CCA (clear channel assessment) threshold, it is determined as the channel is busy. Otherwise, it is determined as the channel is idle. In this case, if eNBs using bandwidths different from each other use the same CCA threshold, a problem that channel reservation becomes unequal may occur.

For example, assume that the whole channel is 20 MHz and an eNB1 transmits a signal using the whole of the 20 MHz. And, assume that an eNB2 uses 10 MHz only among the 20 MHz and an eNB3 uses the remaining 10 MHz only not used by the eNB2. In this case, assume that all of the three eNBs are close to each other. In this case, if the eNB2 occupies a channel, although power of the eNB2 is concentrated on 10 MHz band only, the eNB1, which performs CS on 20 MHz band including the 10 MHz band, considers that the channel is busy. However, the eNB3, which performs CS on the remaining 10 MHz band only not used by the eNB2, considers that the channel is idle and the eNB3 transmits a signal. If the operation is repeated between the eNB2 and the eNB3, the eNB1 may have a very limitative opportunity for transmitting a signal.

In order to solve the problem, it is necessary to control a CS operation according to a bandwidth on which a signal is transmitted by an eNB (or a bandwidth on which CS is performed). In particular, it is necessary to make both an eNB performing CS on a narrow band and an eNB performing CS on a wide band equally occupy a channel. This can be implemented by making the eNB performing CS on the narrow band more conservatively determine idle of a channel.

As an example, as a CS bandwidth is narrower, it may configure a CCA threshold to be lower in terms of PSD. When such a relationship as CS bandwidth B1>B2 is satisfied, a CCA threshold applied to each case is defined as Th1 and Th2, respectively. It may be able to make such a relationship as Th1/B1>Th2/B2 to be satisfied. By doing so, when identical PSD is detected, it may be able to make an eNB performing CS on a narrower band determine a channel as busy.

As a different example, as a CS bandwidth is narrower, it may be able to configure a backoff value to be greater. In a general contention-based resource access, an eNB randomly selects a backoff value. If the count of examining an idle channel is matched with the selected backoff value, it may be able to configure the eNB to transmit a signal. In this case, it may be able to determine a backoff value range from which the backoff value is randomly selected. It may be able to configure an eNB performing CS on a narrower band to have a high probability of selecting a bigger backoff value.

As a further different example, as a CS bandwidth is narrower, it may be able to configure a minimum idle period between continuous signal transmissions to be longer. In an unlicensed band, although a channel is idle and an eNB initiates transmission, the transmission is not maintained for a long time to provide a different eNB with an opportunity of transmitting a signal. After the transmission is terminated, it may have a prescribed idle period. If signal transmission of a different eNB does not exist, the eNB can continuously perform the transmission of the eNB. In this case, an eNB having a narrower CS bandwidth may have a relatively longer idle period to enable an eNB having a wider CS bandwidth to attempt transmission.

As a further different example, as a CS bandwidth is narrower, it may be able to configure a length of continuous signal transmission time to be shorter. In particular, an eNB having a narrower CS bandwidth terminates transmission relatively soon and has an idle period to enables an eNB having a wider CS bandwidth attempt transmission.

So far, downlink transmission of an eNB is mainly described. However, the operation of the present invention can be applied to uplink transmission as well. As an example, if RRP is set to uplink, an eNB informs a neighboring eNB of the RRP set to the uplink to notify timing of uplink transmission of a UE connected with the eNB and a resource where the uplink transmission occurs (or, if a backhaul link is slow, timing and situation of the uplink transmission). Of course, when an eNB configures uplink RRP via CS, it may be able to configure RRP configuration to be performed only when a channel is idle. In uplink, if an eNB schedules uplink transmission without a separate signaling on a UE, the UE can perform uplink transmission according to the scheduling of the eNB. Hence, the operation can be considered as the eNB informs a neighboring eNB of an uplink scheduling plan of the eNB or a previous scheduling result. Having received the uplink scheduling plan of the eNB or the previous scheduling result, the eNB can schedule downlink or uplink transmission of the eNB. As an example, when a neighboring eNB declares uplink RRP setting, it may be able to prevent strong interference between UEs by avoiding downlink scheduling to a UE adjacent to the neighboring eNB.

Each of the aforementioned methods can be used independently. Or, the methods can be used in a manner of being combined with each other.

Figure 19:
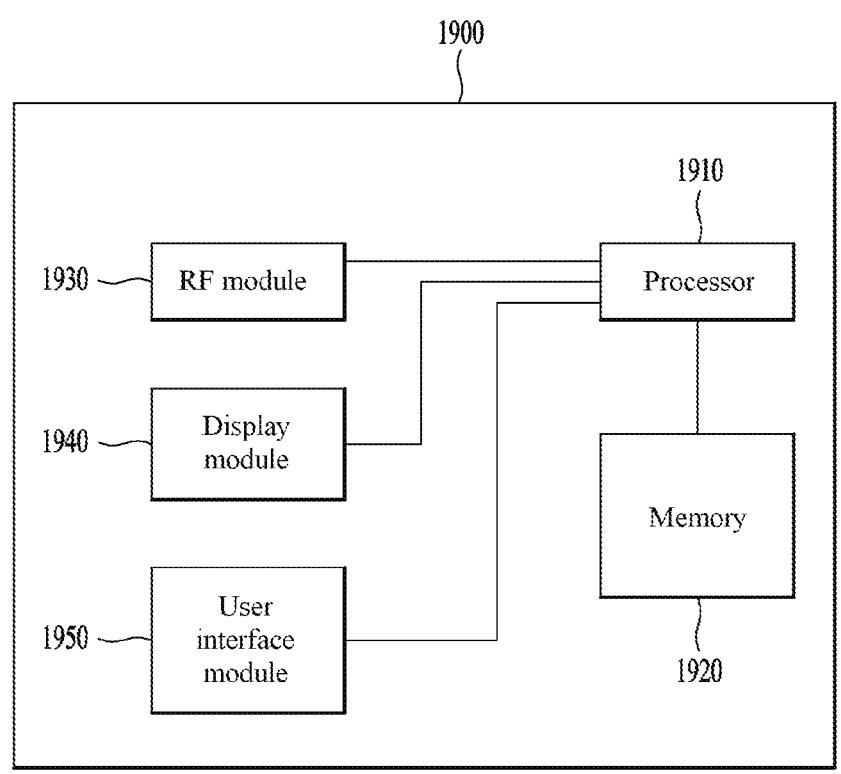
FIG. 19 is a block diagram for a communication device according to one embodiment of the present invention.

FIG. 19 is a block diagram for a communication device according to one embodiment of the present invention.

Referring to FIG. 19, a communication apparatus 1900 includes a processor 1910, a memory 1920, an RF module 1930, a display module 1940, and a User Interface (UI) module 1950.

The communication device 1900 is shown as having the configuration illustrated in FIG. 19, for the convenience of description. Some modules may be added to or omitted from the communication apparatus 1900. In addition, a module of the communication apparatus 1900 may be divided into more modules. The processor 1910 is configured to perform operations according to the embodiments of the present invention described before with reference to the drawings. Specifically, for detailed operations of the processor 1910, the descriptions of FIGS. 1 to 18 may be referred to.

The memory 1920 is connected to the processor 1910 and stores an Operating System (OS), applications, program codes, data, etc. The RF module 1930, which is connected to the processor 1910, upconverts a baseband signal to an RF signal or downconverts an RF signal to a baseband signal. For this purpose, the RF module 1930 performs digital-to-analog conversion, amplification, filtering, and frequency upconversion or performs these processes reversely. The display module 1940 is connected to the processor 1910 and displays various types of information. The display module 1940 may be configured as, not limited to, a known component such as a Liquid Crystal Display (LCD), a Light Emitting Diode (LED) display, and an Organic Light Emitting Diode (OLED) display. The UI module 1950 is connected to the processor 1910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of eliminating inter-cell interference in an unlicensed band in a wireless communication system and an apparatus therefor are described with reference to examples applied to 3GPP LTE system, it may be applicable to various kinds of wireless communication systems as well as the 3GPP LTE system.

What is claimed is:

1. A method of reporting channel state information in an unlicensed band by a user equipment in a wireless communication system, the method comprising:
setting a plurality of reservation resource sections of a serving cell to measure the channel state information in the unlicensed band via a higher layer;
measuring the channel state information on the unlicensed band in each of a plurality of the reservation resource sections based on a carrier sensing result of a neighbor cell and information on whether the neighbor cell sets a reservation resource section; and
reporting the measured channel state information to the serving cell,
wherein if a reservation resource section of the serving cell for measuring the channel state information corresponds to a first type, the reservation resource section of the serving cell corresponds to a resource configured as a reservation resource section of the neighbor cell and
wherein if the reservation resource section of the serving cell for measuring the channel state information corresponds to a second type, the reservation resource section of the serving cell corresponds to a resource which is not configured as the reservation resource section of the neighbor cell.

2. The method of claim 1, wherein if the reservation resource section of the serving cell for measuring the channel state information corresponds to the first type, the measuring the channel state information on the unlicensed band comprises measuring the channel state information under an assumption that interference occurs due to a signal transmitted by the neighbor cell in the reservation resource section of the first type.

3. The method of claim 1, wherein if the reservation resource section of the serving cell for measuring the channel state information corresponds to the second type, the measuring the channel state information on the unlicensed band comprises measuring the channel state information under an assumption that interference occurs from a node adjacent to the neighbor cell, although there is no interference due to a signal transmitted by the neighbor cell in the reservation resource section of the second type.

4. The method of claim 1, wherein the plurality of the reservation resource sections correspond to sections determined as being in a channel idle state as a result of carrier sensing of the serving cell.

5. The method of claim 1, wherein the reservation resource section of the second type is in a channel idle state as a result of carrier sensing of the neighbor cell and corresponds to the resource which is not configured as a reservation resource section by the neighbor cell.

6. The method of claim 5, wherein if the reservation resource section of the serving cell for measuring the channel state information corresponds to a third type, the reservation resource section of the third type is in a channel busy state as a result of carrier sensing of the neighbor cell and corresponds to the resource which is not configured as a reservation resource section by the neighbor cell.

7. A user equipment in a wireless communication system, the user equipment comprising:
a wireless communication module configured to transceive a signal with a serving cell through a licensed band or an unlicensed band; and
a processor configured to process the signal, the processor configured to control the wireless communication module to measure channel state information on the unlicensed band in each of a plurality of reservation resource sections of the serving cell in the unlicensed band configured via a higher layer based on a carrier sensing result of a neighbor cell and information on whether the neighbor cell sets a reservation resource section and report the measured channel state information to the serving cell,
wherein if a reservation resource section of the serving cell for measuring the channel state information corresponds to a first type, the reservation resource section of the serving cell corresponds to a resource configured as a reservation resource section of the neighbor cell and
wherein if the reservation resource section of the serving cell for measuring the channel state information corresponds to a second type, the reservation resource section of the serving cell corresponds to a resource which is not configured as the reservation resource section of the neighbor cell.

8. The user equipment of claim 7, wherein if the reservation resource section of the serving cell for measuring the channel state information corresponds to the first type, the processor is configured to measure the channel state information under an assumption that interference occurs due to a signal transmitted by the neighbor cell in the reservation resource section of the first type.

9. The user equipment of claim 7, wherein if the reservation resource section of the serving cell for measuring the channel state information corresponds to the second type, the processor is configured to measure the channel state information under an assumption that interference occurs from a node adjacent to the neighbor cell, although there is no interference due to a signal transmitted by the neighbor cell in the reservation resource section of the second type.

10. The user equipment of claim 7, wherein the plurality of the reservation resource sections correspond to sections determined as being in a channel idle state as a result of carrier sensing of the serving cell.

11. The user equipment of claim 7, wherein the reservation resource section of the second type is in a channel idle state as a result of carrier sensing of the neighbor cell and corresponds to a resource which is not configured as a reservation resource section by the neighbor cell.

12. The user equipment of claim 11, wherein if the reservation resource section of the serving cell for measuring the channel state information corresponds to a third type, the reservation resource section of the third type is in a channel busy state as the result of carrier sensing of the neighbor cell and corresponds to the resource which is not configured as the reservation resource section by the neighbor cell.

* * * * *